(12) United States Patent
Kredi et al.

(10) Patent No.: US 12,192,194 B1
(45) Date of Patent: Jan. 7, 2025

(54) CACHING NETGROUPS

(71) Applicant: VAST DATA LTD., Tel Aviv (IL)

(72) Inventors: Amir Kredi, Tel Aviv (IL); Yair Elharrar, Tel Aviv (IL); Erez Zilber, Tel Aviv (IL); Ilan Steinberg, Tel Aviv (IL); Asaf Levy, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 152 days.

(21) Appl. No.: 18/149,028

(22) Filed: Dec. 30, 2022

(51) Int. Cl.
*H04L 9/40* (2022.01)
*H04L 67/568* (2022.01)

(52) U.S. Cl.
CPC .......... *H04L 63/083* (2013.01); *H04L 63/104* (2013.01); *H04L 67/568* (2022.05)

(58) Field of Classification Search
None
See application file for complete search history.

(56) References Cited

U.S. PATENT DOCUMENTS

| 10,270,759 | B1 * | 4/2019 | Bordelon | G06F 9/4843 |
| 2018/0007133 | A1 * | 1/2018 | Kong | H04L 67/1097 |
| 2020/0272526 | A1 * | 8/2020 | Bhole | G06F 11/3409 |
| 2020/0401458 | A1 * | 12/2020 | Roy | G06F 9/4887 |

* cited by examiner

*Primary Examiner* — Clayton R Williams
(74) *Attorney, Agent, or Firm* — Reches Patents

(57) ABSTRACT

A method for network group based access control, the method may include (i) receiving a request to access content stored in a storage system, the request is associated with a user and a network group that is suggested to include the user; (ii) generating a user key based on an identifier of the user and the network group; (iii) determining, based in part on the user key, whether the user is a current user of the network group, and (iv) declining the request when the user is not the current user of the network group. The determining may include determining that the user is not a current user of the network group when a user finding timestamp of the user precedes a network group finding timestamp of the network group.

20 Claims, 3 Drawing Sheets

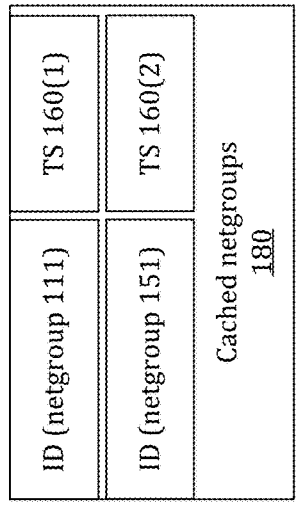

FIG. 1C

| | | |
|---|---|---|
| ID (netgroup 111) | TS 160(1) | |
| ID (netgroup 151) | TS 160(2) | |

Cached netgroups 180

| | | |
|---|---|---|
| Hash (user121, netgroup 111) | TS 170(1) | Validity 140(1) |
| Hash (user122, netgroup 111) | TS 170(2) | Validity 140(2) |
| Hash (user123, netgroup 111) | TS 170(3) | Validity 140(3) |
| Hash (user124, netgroup 111) | TS 170(4) | Validity 140(4) |
| Hash (user125, netgroup 111) | TS 170(5) | Validity 140(5) |
| Hash (user126, netgroup 111) | TS 170(6) | Validity 140(6) |
| Hash (user127, netgroup 111) | TS 170(7) | Validity 140(7) |
| Hash (user128, netgroup 111) | TS 170(8) | Validity 140(8) |
| Hash (user129, netgroup 151) | TS 170(9) | Validity 140(9) |
| Hash (user130, netgroup 151) | TS 170(10) | Validity 140(10) |
| Hash (user131, netgroup 151) | TS 170(11) | Validity 140(11) |
| Hash (user132, netgroup 151) | TS 170(12) | Validity 140(12) |

Cached users 190

FIG. 1D

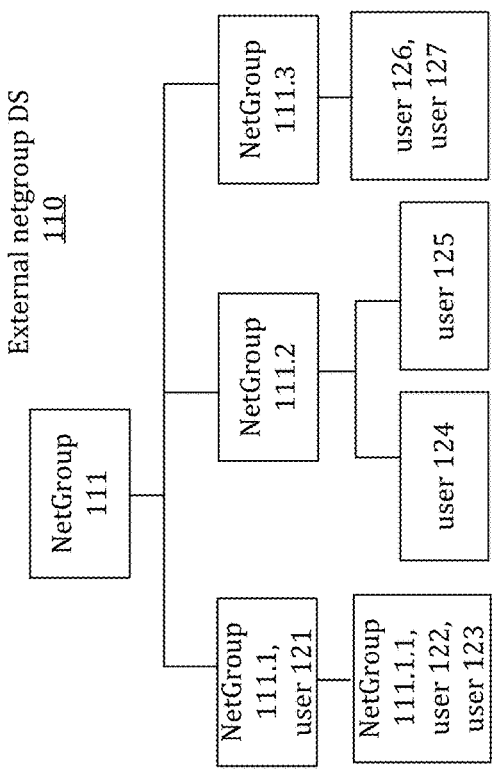

FIG. 1A

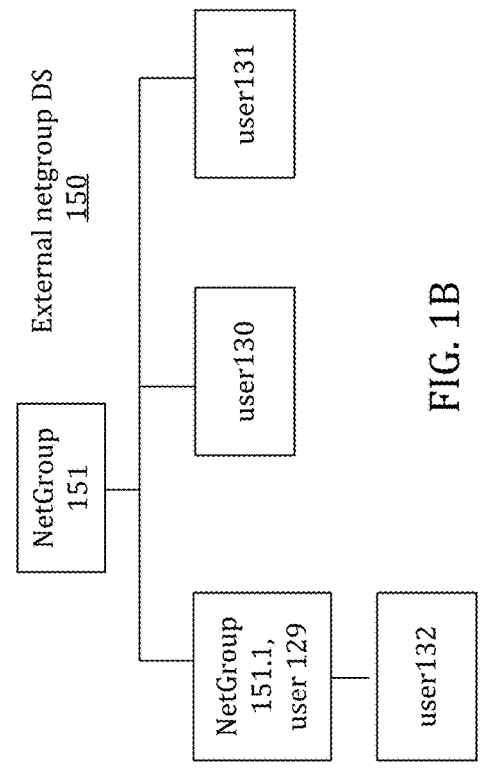

FIG. 1B

CACHING NETGROUPS

BACKGROUND

A network group (known as "netgroup") can be defined by using directory information services for a network-wide group of hosts (users' machines), for facilitating authorization and authentication for the users of the group, such as assigning specific file system access to different groups. Network groups information is stored at network directory information services, such as LDAP (Lightweight Directory Access Protocol) and NIS (Network Information Service), located at a central location, external to systems that use the directory information service.

The network group structure of e.g., LDAP, may have a hierarchical structure, in a form of a tree that represents the groups and individual users of one organization. The topmost entry of a directory is known as the root entry, representing the organization that owns the directory. Entries at the higher level of hierarchy, represent larger groupings, and may include identifiers and pointers to sub-network groups beneath the higher-level groups. Entries under the larger groupings represent smaller groupings, and include identifiers of smaller network groups. The leaf nodes represent the individuals, i.e., hosts. Each node points to the next level, and/or includes a host (user) identifier (IP address, DNS, etc.).

When a storage system needs to authenticate a user access request that includes a network group and a user identifier (e.g., IP address), the storage system accesses the external directory service for scanning the network group structure and looking up the user identifier in the structure of the specified network group.

Once the user is found in the network group data structure, the access policies of the user can be checked for authenticating the access request. If the user is not found in the network group data structure-access is denied, as the user cannot be authenticated.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 1A is an example of an external data structure:
FIG. 1B is an example of an external data structure:
FIG. 1C is an example of a cached data structure:
FIG. 1D is an example of a cached data structure.

DETAILED DESCRIPTION

Figure 2:
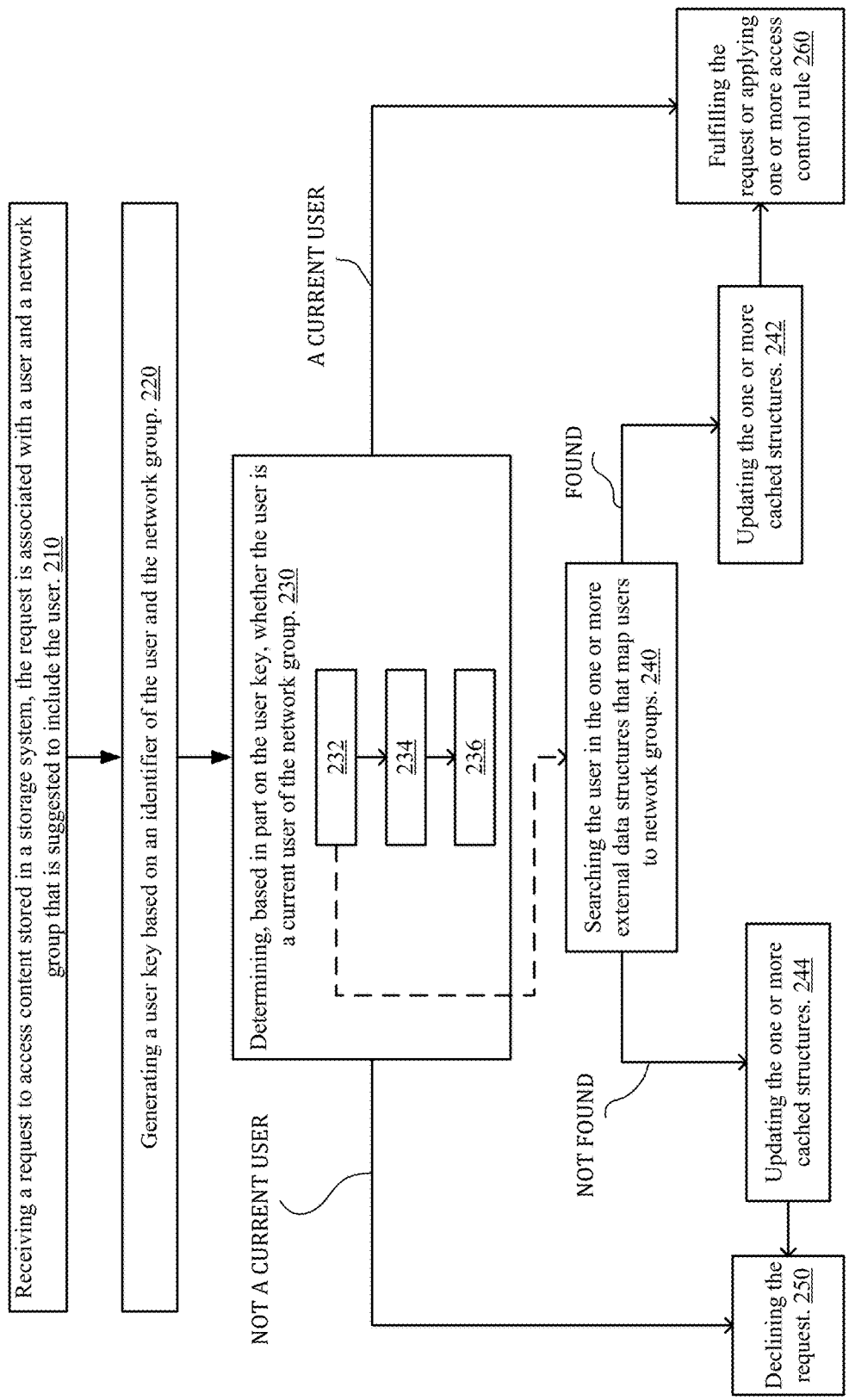
FIG. 2 is an example of a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a compute core. The compute core can be a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the application may be provided.

There may be provided a method for network group based access control, the method may include: receiving a request to access content stored in a storage system, the request is associated with a user and a network group that is suggested to include the user: generating a user key based on an identifier of the user and the network group: determining, based in part on the user key, whether the user is a current user of the network group: wherein the determining may include: accessing one or more cached structures that are cached in the storage system, the one or more cached structures store users finding timestamps and network group finding timestamps, wherein a finding timestamp associated with the user is indicative of a most recent finding iteration that found the user in one or more external data structures that map users to network groups: wherein a finding timestamp associated with the network group is indicative of a most recent finding iteration that found the network group in the one or more external data structures: determining that the user is not a current user of the network group when a user finding timestamp of the user precedes a network group finding timestamp of the network group; and declining the request when the user is not the current user of the network group.

The user finding timestamp of the user is stored in a first cached data structure and the network group finding timestamp is stored in a second cached data structure.

The method may include accessing the first cached data structure using the user key.

The method may include accessing the second cached data structure using a network group identifier.

The method may include avoiding from storing in the one or more cached data structures information about any intermediate network group that includes the user and may be included in the network group, even when the intermediate network group may be found during one or more finding iterations.

The one or more cached data structures may be generated based on previous requests to access contents stored in the storage system.

The one or more cached data structures may be also generated based on cache refresh operations that may include accessing the one or more external data structures.

The method may include finding that the user was omitted from the network group.

The method may include finding that the user may be not included in the network group and that information about the user may be not included in the one or more cached data structures; and adding an invalid user indicator to the one or more cached data structures, in association with the user key of the user.

The method may include applying at least one additional access control rule on the request to determine whether to respond to the request when the user may be a current user of the network group.

There may be provided a method, system and non-transitory computer readable medium for caching users of network groups related to directory services, used by network group based access control.

External network group data structures, stored at a directory service provider, are accessed for scanning by a storage system, when there is a need to authenticate access to certain filesystem entities via certain filesystem commands, for example for exposing (e.g., mounting command) a certain directory or a certain sub-tree. Before the access requested by the user can be authorized, there is a need to check the directory service for the existence of the requesting user in the network group indicated in the request, and if the user exists—it can be checked for authorization of the access in the filesystem permission data structures.

Partial information from multiple external network group data structures is cached in the memory of the storage system. Only relevant information from the external network group data structure is cached, so as to save storage space, and further stored in a manner that facilitates accelerating searches of users that are part of huge network group data structures, without needing to scan the cache. Each external network group data structure may be provided to the storage system by a different directory information service provider. There may be multitude external network group data structures, each representing multitude users and sub-groups.

The caching includes associating timestamps (network group finding timestamps) to cached network groups and timestamps (user finding timestamps) to cached users. A data structure that maps network groups to timestamps may be a key-value data structure that maps a network group identifier into a timestamp. The network group timestamp indicates the time when a scan of the external network group data structure related to the network group has started, for caching users found in the external network group data structure.

Another data structure maps user keys into timestamps. The user keys are indicative of the individual users as well as the upper level network groups to which the users belong, and may be a hash value calculated for a combination of the user identifier and the network group identifier. The upper level network group may be any network group (at any hierarchy of the external network group data structure), that was indicated in any user access request that caused scanning of the external network group data structure, and caching the looked up network group and user. The timestamps of this data structure indicate the time when the users' keys were cached (or their caching was refreshed). Therefore, when a scan of the external network group data structure is completed, the cached entries of users that were found during the scan are associated with timestamps that indicate a time that is later than the timestamp of the scanned network group or the same time.

An external network group data structure is accessed and scanned for refreshing the cache, periodically, or upon an implicit request to refresh the cache, or when a user that sent an access request is not found in the cache. Not founding a user in the cache may happen either when the user was added after the previous cache refresh, there was a cache eviction of the not-found user, or a problem encountered during the scan of the external network group data structure.

The cache refresh process includes timestamping cached entries for user that were found during the scan of the external network group data structure. Before starting the scan, the timestamp associated with the cached entry of the network group is set to the current time, i.e., the time of starting a traverse the external network group data structure related to the network group. Then, the nodes of the external network group data structure are traversed. Nodes that identify only lower level network groups are not cached, but only used for further traversing the lower-level nodes. Only the content of nodes that include information about one or more users is relevant for caching the user information.

When a user information is found during the scan, a hash is calculated on a combination of the found user identifier (e.g., IP address) and the identifier of the topmost scanned network group. The result of the hash is a user key that is used for searching the cache for existence of the user. If the user is not found-a new user entry is added with the user key. The cached entry of a user is associated with a timestamp that includes the current time (the caching time). It is noted that unlike searching a specific user in the external network group data structure, which requires traversing a non-sorted tree, searching for a user in the cache involves only accessing a hash table with a user key, which in most cases involves one direct access for reading the requested user entry associated with the key.

A request that requires authentication for accessing a filesystem entity (for example, a mount request for exposing a filesystem directory or sub-tree), generally includes identification of the requestor (user identifier, e.g., IP address), and a network group that defines a group or sub-group where the requestor is catalogued.

Upon receiving the request, the user key that combines the user identifier and the network group indicated in the request is searched in the cache. If a user cached entry is found in the cache, the first timestamp associated with the cached user entry is compared to the second timestamp of the cached network group of the user. If the first timestamp indicates a time that is not earlier than the second timestamp (i.e., the user entry was cached at the same time or later than the start time of scanning the external network group data structure)—then it can be determined that the user is indeed part of the network group, and the permission associated with the user's network group can be checked for the authorization of accessing the filesystem entity. The permission for accessing the filesystem entity by the requesting user may be searched in a filesystem permission data structure, such as ACL (Access Control List) that includes for each filesystem entity-information indicative of the network groups that can access the filesystem entity and the type of allowed accesses (read, write).

If the timestamp associated with the cached user entry indicates a time that is earlier than the timestamp of the cached network group—it means that the user was deleted, and the previous scan did not cache the user entry, and therefore the user entry became a stale entry. In this case, the stale user cached entry is deleted, and the access request is denied.

The refresh process does not clear cached entries of users that were not found during the scan. Such obsolete user keys will be associated with timestamps that are older than the network group timestamp, and therefore, a subsequent search of the corresponding user identifier, in response to an access request that required authentication, will determine that the cached user key is stale, and will deny the access request. In this manner, a complicated process of deleting all the entries related to a scanned network group, before starting the scan, is eliminated, and time is saved.

When a user identifier included in an access request is not found in the cache, it is searched in the external network group data structure. If the user is not found also in the external network group data structure-then the corresponding user key will be cached with an indication of an invalid user and a timestamp, in a similar manner to a regular cached user entry. When such a user identifier is included in a subsequent access request, the cache is looked up and the entry of the invalid user identifier will be found. The access is denied based on the cached invalid user identifier. The access may be denied only when the timestamp of the invalid user is later than (or equal to) the timestamp of the network group, meaning that the invalidation occurred as part of the last scan of the network group. The entry may be also considered invalid for a certain time starting from the timestamp, e.g., for a duration of 5 seconds, 1 minute, etc. Therefore, if more than a certain time has passed since the timestamp of the cached invalid user identifier, then there is an attempt to scan again the external network group data structure for the requested user identifier.

FIGS. 1A and 1B illustrates simple examples of external network group data structures (DS) 110 and 150 that are scanned for caching relevant user information found during the scan. FIG. 1C illustrates cached network groups 180 and cached users 190, derived from the scan of external network group data structures (DS) 110 and 150.

Each of data structures 110 and 150 includes information that is relevant for caching, such as the identifiers of users 121-127 and users 129-132, which may be a DNS or an IP address, and further includes information that is not relevant for the caching (but is needed for facilitating the traversing), such as the lower-level network groups (denoted "net-groups") 111.1-111.3, 111.1.1 and 151.1.

FIG. 1C illustrates two cached entries for the two scanned external network group data structures. The first entry includes a network group identifier (ID) of root network group 111 and the second entry a network group identifier of root network group 151. Each entry further includes the timestamp 160(1) or 160(2) indicating the time when the last scan of the corresponding data structure 110 or 150 has started.

FIG. 1D illustrates cached users 190 that includes an entry per each user that was found in a scan of an external network group data structure. Each cached user entry is associated with and/or includes a hash of a combination of a network group and a user identifier (e.g., IP, wherein when DNS represents users in the external network group data structures—it may be translated into one or more IP addresses). For example, there are hash values for users 121-128 of network group 111 and hash values of users 129-132 of network group 151. The hash values may be used for looking up users. Each cached user entry includes a timestamp, such as TS 170(1)-170(12).

Each cached user entry may further include a validity indication, such as validity 140(1)-140(12). This field is used mainly for identifying a cached user entry that is stale. For example, suppose an access request is received from user 128, indicating the user and network group 111. Suppose the user is not found in the cache, and external network group DS 110 is scanned for that user, but no such user is found. This user will be cached with a validity indication (in this example, validity 140(8) of user 128) set to a value indicating invalidity. So that subsequent accesses by user 128 of network group 111 will look up the cache and find an entry indicating that the user does not exist in network group 111, so there is no need to scan the external network group data structures. The access request of a user indicated as invalid—is denied.

FIG. 2 illustrates an example for method 200 for network group based access control.

Method 200 may start by step 210 of receiving a request to access content stored in a storage system, the request is associated with a user and a network group that is suggested to include the user. A user identifier and a network group identifier may be a part of the request or may me associated in any other manner (for example sent at a known time relationship with the request) with the request.

The user may identify himself as belonging to a certain network group. If there are multiple possible network groups that include the user (e.g., network groups at different hierarchies)—the user may select which one to associated with the request. For example—user 121 may associate himself with network group 111.1 or network group 111.

Step 210 may be followed by step 220 of generating a user key based on an identifier of the user and the network group. FIG. 1D illustrates a user key that is calculated by applying a hash function on the user identifier and the network group identifier. Functions other than hash may be applied to generate the user key.

Step 220 may be followed by step 230 of determining, based in part on the user key, whether the user is a current user of the network group.

Step 230 may include steps 232, 234 and 236.

Step 232 may include accessing one or more cached structures that are cached in the storage system. The one or more cached structures store users finding timestamps and network group finding timestamps.

A finding timestamp associated with the user is indicative of a most recent time when the user was found in one or more external data structures that map users to network groups. The user finding timestamp may be the start time of the finding iteration or a time during the iteration, such as the time when the user was found and cached. See, for example, time stamps TS 170(1)-170(12) of cached users 190 of FIG. 1D.

A finding timestamp associated with the network group is indicative of a most recent finding iteration that found the network group in the one or more external data structures. See, for example, time stamps TS 160(1)-160(2) of cached network groups 180 of FIG. 1C.

The one or more cached data structures store a small fraction (for example—less than 0.001, 0.005, 0.1, 0.5, 1, 5, 10, 20 percent of the external data structures). Particularly, the cached data structures do not store information about network groups or intermediate network groups that were not indicated in requests to access content, and do not store users that did not initiated requests to access content.

Step 232 may be followed by step 234 of comparing the user finding timestamp of the user to a network group finding timestamp of the network group.

Step 234 may be followed by step 236 of determining whether the user is a current user of the network group based on the result of the comparison of step 234.

For example—step 236 may include determining that the user is not a current user of the network group when a user finding timestamp of the user precedes a network group finding timestamp of the network group.

The external data structure related to the user and the network group is scanned in a manner that includes accessing the network group before accessing the entries of the user (if the user still exists).

a. If the user still exists in the network group then the user finding timestamp follows (represents a later point in time) the network group finding timestamp or equal to the network group finding timestamp.

b. If the user seizes to exist in the network group then the user finding timestamp precedes (represents a previous point in time of a previous finding iteration) the network group finding timestamp.

When determining that the user is not a current user of the network group then step 230 may be followed by step 250 of declining the request.

When determining that the user is a current user of the network group then the user is deemed to be authenticated and step 230 may be followed by step 260 of fulfilling the request or applying one or more access control rule other than step 230.

Referring back to steps 232 and 234. Step 234 included a comparison between finding timestamps. It should be noted that at least the user finding timestamp may not be found in the one or more cached structures. In this case step 232 may be followed by step 240 of searching the user in the one or more external data structures that map users to network groups.

If the user is found (and belongs to the network group) then step 240 is followed by step 242 of updating the one or more cached structures accordingly, the user is deemed to belong to the network group, and step 240 is followed by step 260.

If the user is not found (does not belong to the network group) then step 240 is followed by step 244 of updating the one or more cached structures to indicate that the user is invalid. This will prevent future iterations of step 240. Step 244 may be followed by step 250. The updating of the one or more cached structures may include adding an entry that includes the user key (indicative of the user identifier and the network group), a timestamp of the current time (time of updating) and an invalidity indication of the user.

Figure 3:
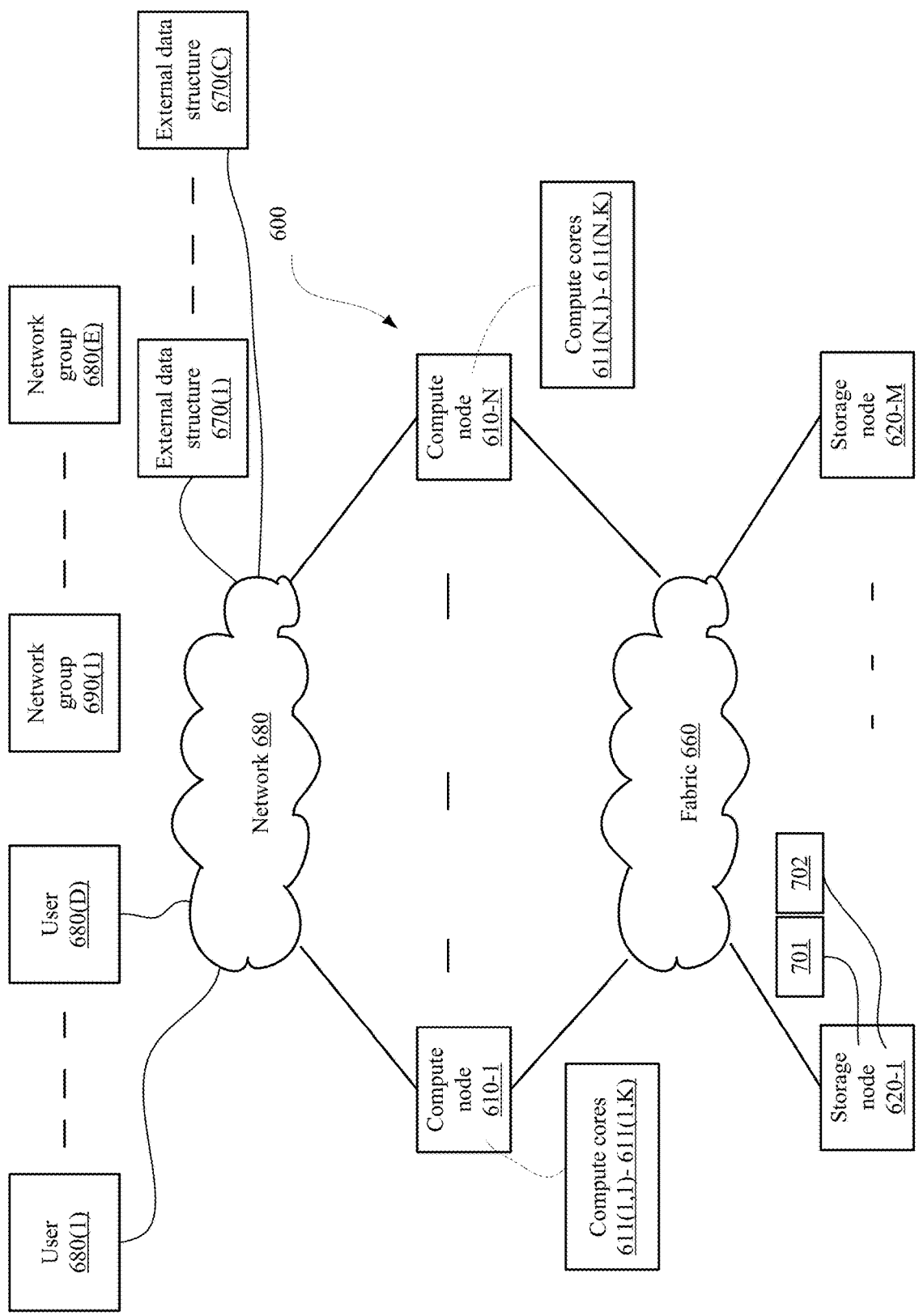
FIG. 3 is an example of a storage system.

FIG. 3 illustrates an example of a storage system and its environment.

For simplicity of explanation other storage systems are not shown and may have a similar structure.

The environment may include external data structures 670(1)-670(C), users 680(1)-680(D), network groups 690(1)-690(E). The external data structures 670(1)-670(C) may be accessed via other networks beside network 680 that couples users 680(1)-680(D) to the storage system.

The storage system 600 may store cached data structures such as first cached data structure 701 and second cached data structure 702. In FIG. 3 storage node 620-1 stores both cached data structures.

The first cached data structure 701 and/or the second cached data structure 702 may be stored in one or more storage nodes and/or in one or more compute nodes.

The storage system 600 may include a number of N compute nodes 610-1 through 610-N (hereinafter referred to individually as a compute node 610 and collectively as compute nodes 610, merely for simplicity purposes, N is an integer equal to or greater than 1). The compute nodes include (or may execute) multiple compute cores each (for example 611(1,1)-611(1,K) of compute node 610-1 and 611(N,1)-611(N,K) of compute node 610-N).

The storage system 600 also includes a number of M storage nodes 620-1 through 620-M (hereinafter referred to individually as a storage node 620 and collectively as storage nodes 620, merely for simplicity purposes, M is an integer equal to or greater than 1). The computer nodes 610 and the storage nodes 620 are connected through a communication fabric 660. M may equal N or may differ from N. Multiple of the compute nodes and/or one or more compute cores of at least one compute core may execute method 200.

In an embodiment, a compute node 610 may be realized as a physical machine or a virtual machine. A physical machine may include a computer, a sever, and the like. A virtual machine may include any virtualized computing instance (executed over a computing hardware), such as a virtual machine, a software container, and the like.

It should be noted that in both configurations (physical or virtual), the compute node 610 does not require any dedicated hardware.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method for determining a progress of an execution of a task, the method comprises:
   updating, by a compute element of a first plurality of compute elements, a compute entity entry of a shared task status data structure, with a current progress made by the compute element in relation to the execution of the task; wherein the compute entity entry belongs to the shared task status data structure and is allocated to the compute element;
   determining, by the compute element, whether to update a group entry of the shared task status data structure; wherein the group entry stores information about a progress of a group of compute elements that includes the compute element and some other compute elements of the first plurality of compute elements;
   updating, in the group entry, a value representing an aggregate progress of the group, when determining to update the group entry;
   accessing only a portion of the shared task status data structure that (a) is associated with the task, wherein the task is executed by the first plurality of compute elements, and (b) comprises multiple hierarchical levels; wherein an entry of a certain of the multiple hierarchical levels represents an aggregate progress associated with multiple entries of another hierarchical level of the multiple hierarchical levels; the certain hierarchical level is higher than the another hierarchical level; and
   determining the progress of the execution of the task based on a content of the portion.

2. The method according to claim 1 wherein the portion is included in a highest hierarchical level of the shared task status data structure.

3. The method according to claim 1 comprising performing a storage system related operation in response to the progress.

4. The method according to claim 1 comprising delaying an execution of a storage system related operation in response to the progress.

5. The method according to claim 1 comprising allocating at least one other task to a second plurality of compute elements in response to the progress.

6. The method according to claim 1 wherein the shared task status data structure is updated by at least some of the first plurality of compute elements.

7. The method according to claim 1 comprising updating the shared task status data structure by at least some of the first plurality of compute elements.

8. The method according to claim 1 wherein compute elements of the first plurality of compute elements are arranged in a hierarchical manner.

9. The method according to claim 8 wherein a number of hierarchical levels of the first plurality of compute elements differs from the number of the multiple hierarchical levels.

10. The method according to claim 1 wherein the portion belongs to a highest hierarchical level of the multiple hierarchical levels, wherein the highest hierarchical level stores a summation of progress of the task by all compute elements of the first plurality of compute elements.

11. A non-transitory computer readable medium for determining a progress of an execution of a task, the non-transitory computer readable medium stores instructions for:

updating, by a compute element of a first plurality of compute elements, a compute entity entry of a shared task status data structure, with a current progress made by the compute element in relation to the execution of the task; wherein the compute entity entry belongs to the shared task status data structure and is allocated to the compute element;

determining, by the compute element, whether to update a group entry of the shared task status data structure; wherein the group entry stores information about a progress of a group of compute elements that includes the compute element and some other compute elements of the first plurality of compute elements;

updating, in the group entry, a value representing an aggregate progress of the group, when determining to update the group entry;

accessing only a portion of the shared task status data structure that (a) is associated with the task, wherein the task is executed by the first plurality of compute elements, and (b) comprises multiple hierarchical levels; wherein an entry of a certain of the multiple hierarchical levels represents an aggregate progress associated with multiple entries of another hierarchical level of the multiple hierarchical levels; the certain hierarchical level is higher than the another hierarchical level; and determining the progress of the execution of the task based on a content of the portion.

12. The non-transitory computer readable medium according to claim 11 wherein the portion is included in a highest hierarchical level of the shared task status data structure.

13. The non-transitory computer readable medium according to claim 11 that stores instructions for performing a storage system related operation in response to the progress.

14. The non-transitory computer readable medium according to claim 11 that stores instructions for delaying an execution of a storage system related operation in response to the progress.

15. The non-transitory computer readable medium according to claim 11 that stores instructions for allocating at least one other task to a second plurality of compute elements in response to the progress.

16. The non-transitory computer readable medium according to claim 11 wherein the shared task status data structure is updated by at least some of the first plurality of compute elements.

17. The non-transitory computer readable medium according to claim 11 that stores instructions for updating the shared task status data structure by at least some of the first plurality of compute elements.

18. The non-transitory computer readable medium according to claim 11 wherein compute elements of the first plurality of compute elements are arranged in a hierarchical manner.

19. The non-transitory computer readable medium according to claim 18 wherein a number of hierarchical levels of the first plurality of compute elements differs from the number of the multiple hierarchical levels.

20. The non-transitory computer readable medium according to claim 11 wherein the portion belongs to a highest hierarchical level of the multiple hierarchical levels, wherein the highest hierarchical level stores a summation of progress of the task by all compute nodes of the first plurality of compute node.

* * * * *